US007015699B1

(12) United States Patent
Suntio

(10) Patent No.: US 7,015,699 B1
(45) Date of Patent: Mar. 21, 2006

(54) STANDBY ELECTRIC SUPPLY AND A METHOD FOR CONTROLLING THE OPERATION OF A STANDBY ELECTRIC SUPPLY

(75) Inventor: Teuvo Suntio, Klaukkala (FI)

(73) Assignee: Delta Energy Systems AG, (CH)

( * ) Notice: Subject to any disclaimer, the term of this patent is extended or adjusted under 35 U.S.C. 154(b) by 394 days.

(21) Appl. No.: 10/111,584

(22) PCT Filed: Nov. 3, 2000

(86) PCT No.: PCT/FI00/00962

§ 371 (c)(1),
(2), (4) Date: Apr. 24, 2002

(87) PCT Pub. No.: WO01/33690

PCT Pub. Date: May 10, 2001

(30) Foreign Application Priority Data

Nov. 5, 1999 (FI) .................................. 19992396

(51) Int. Cl.
*G01N 27/416* (2006.01)
(52) U.S. Cl. ................................................... 324/429
(58) Field of Classification Search ............... 324/429; 320/116, 122; 307/10.6, 64, 66
See application file for complete search history.

(56) References Cited

U.S. PATENT DOCUMENTS

| 4,473,756 A | * | 9/1984 | Brigden et al. ............... 307/66 |
| 4,629,965 A | | 12/1986 | Fallon et al. ................ 320/156 |
| 4,742,289 A | | 5/1988 | Wahlström ................... 320/132 |
| 4,742,290 A | | 5/1988 | Sutphin et al. .............. 320/149 |
| 5,175,485 A | | 12/1992 | Joo ............................. 320/159 |
| 5,206,578 A | | 4/1993 | Nor ............................. 320/118 |
| 5,581,170 A | | 12/1996 | Mammano et al. ......... 320/116 |
| 5,625,272 A | | 4/1997 | Takahashi ................... 320/116 |
| 5,675,233 A | * | 10/1997 | Kaneko et al. .............. 320/122 |
| 5,932,932 A | * | 8/1999 | Agatsuma et al. ......... 307/10.6 |
| 5,998,967 A | * | 12/1999 | Umeki et al. ................ 320/122 |

FOREIGN PATENT DOCUMENTS

FR 2722336 7/1994
GB 2261735 5/1993

* cited by examiner

Primary Examiner—Pia Tibbits
(74) Attorney, Agent, or Firm—Klarquist Sparkman, LLP

(57) ABSTRACT

The standby electric supply comprises an accumulator which comprises multiple interconnected blocks, a switching portion that conditionally connects the accumulator to a load or to a charging current supply and a measurement and control portion that produces measurement results for describing the state of the accumulator and that controls the switching portion on the basis of the measurement results produced. The measurement and control portion is arranged to measure, at an initial time, the initial value of the open cell voltage of each block from the accumulator when charged and to produce a threshold value from the measured block specific initial value of the open cell voltage. The measured open cell voltage at an observed time different from the initial time is compared with the threshold value. If the measured block specific value of the open cell voltage has reached the threshold value, the switching portion is controlled to connect the accumulator to the charging current supply.

14 Claims, 4 Drawing Sheets

STANDBY ELECTRIC SUPPLY AND A METHOD FOR CONTROLLING THE OPERATION OF A STANDBY ELECTRIC SUPPLY

This application is a § 371 U.S. national stage of PCT/FI00/00962 filed Nov. 3, 2000, which was published in English under PCT Article 21(2) on May 10, 2001, which in turn claims the benefit of Finnish application 19992396 filed Nov. 5, 1999.

TECHNICAL FIELD

The present invention relates generally to accumulator powered uninterrupted power supply systems. Particularly the present invention relates to the optimal controlling of charging and discharging of the accumulators used in such a system.

BACKGROUND

In many electrical appliances an uninterrupted power supply (UPS) system is used for securing the operation of the electrical appliance regardless of the disturbances in the power distribution network. The "uninterrupted power supply system" can also be abridged and referred to as the "standby electric supply".

FIG. 1 presents a general, simple standby electric supply. The AC-supply line 101 connected to the power distribution network is connected to the rectifier units, the number of which can even be only one, but usually there are several units connected parallel to each other. FIG. 1 presents particularly the rectifier units 102 and 103. They produce a certain direct voltage which is supplied through the feed line 104 to the load i.e. to the device 105, the power supply of which is desired to be secured. The feed line 104 has been connected through the switch 106 also to the accumulator unit 107. The system functions so that during the normal operation of the power distribution network the rectifier units 102 and 103 supply electrical power both to the load 105 and to the accumulator unit 107, in which case the accumulator unit remains in charged state. If a disturbance occurs in the power supply network, the accumulator unit starts to discharge to the load 105, the electrical power supply of which is thus not disturbed. When the power distribution network returns to its normal operation, the rectifier units 102 and 103 start again to supply electrical energy both to the load and to the accumulator unit. Then the accumulator unit is recharged with the same amount of electrical charge, which was discharged from it during the disturbance. The switch 106 is opened only under special conditions e.g. when the disturbance lasts long, the accumulator unit has almost entirely discharged and the supplying power cannot be continued without the risk of damaging the accumulator unit.

When the accumulator unit is continuously connected to the charging voltage, this is called permanent charging. The voltage level of the permanent charging has to be selected accurately according to the recommendations of the accumulator manufacturer to ensure as long life as possible for the accumulator unit. It has been found out, however, that closed so called VRLA-accumulators (Valve Regulated Lead-Acid), which are used nowadays generally in accumulator units, tolerate poorly permanent charging compared with the traditional open i.e. flooded lead accumulators. This is thought to be caused by chemical phenomena inside the accumulators, caused by continuous overcharging.

FIG. 2 presents a more advanced so called standby construction, which is otherwise similar to the construction shown in FIG. 1, but a connection and charging device i.e. so called IBCM-module (Intelligent Battery Connection/Charge Module) 201 substitutes for the separating switch of the accumulator. It has a control connection to the accumulator unit 107 from it (presented by a narrow line in the figure) and it can take the charging energy of the accumulators either directly by bypassing the rectifiers from a connection by which the standby system is connected to the power distribution network (presented by a dashed line in the figure) or from the voltage supplied to load generated by the rectifiers. During the normal operation the IBCM-module 201 keeps the accumulator almost continuously separated from the direct voltage supplied by the rectifier units 102 and 103 i.e. from the feed line 104. If the voltage in the feed line 104 falls below the threshold value e.g. because of the disturbance occurring in the power distribution network, the IBCM-module 201 connects the accumulator unit 107 to the feed line 104, in which case the load 105 continues to get electric power.

The charge of the accumulator is discharged slowly by itself also when the accumulator is not connected anywhere. If the IBCM-module 201 detects that the charge of the accumulator 107 has under normal operation dropped below a certain threshold value, it connects the accumulator unit 107 either to the feed line or through a separate rectifier (not shown in FIG. 2) to the power supply network, in which case the accumulator unit is fully charged relatively quickly. After this the IBCM-module 201 disconnects the accumulator unit again from the charging voltage. It has been assumed that using the IBCM-module can even double the life of the accumulator unit.

The problem in the system according to FIG. 2 is finding the right control algorithm for the IBCM-module. A wrong algorithm can even lead to poorer operation of the system and that it wears out the accumulators more than the simple system according to FIG. 1. In addition, a wrong algorithm can contribute in increasing production costs e.g. if the components of the device must therefore be dimensioned for unnecessarily high current.

SUMMARY

An object of the present invention is to present a standby electric supply, which facilitates a long life time for an accumulator unit and which is economical to manufacture and which has good usability. In addition an object of the present invention is that the standby electric supply adapts to the variations in the properties of the components according to the production tolerances and to the changes in environment. Further an object of the invention is to present a method for controlling a standby electric supply so that the other objects mentioned above are attained.

The objects of the present invention are attained by presenting and making certain criteria for the starting and ending of the charging of the accumulator, of which the primary start charging criterium is based on the open cell voltage change monitored in blocks and the primary end charging criterium is based on the value of the charge current time derivate and on the value of voltage difference time derivate.

The standby electric supply according to the present invention comprises:
  an accumulator consisting of blocks
  switching means for conditional connecting of the accumulator to the load or to the charging power source measuring and controlling means for producing measurement results for describing accumulator status and for controlling the switching means on the basis of the measurement results produced.

According to the first embodiment of the invention it is characterized in that the measurement and control means have been arranged:
- to measure the block specific initial value of the open cell voltage of the charged accumulator
- to produce a certain threshold value from the measured initial open cell voltage of a block
- to compare the measured value of the open cell voltage of the block with the threshold value
- as a response to the observation according to which the measured value of the open cell voltage of the block has reached the threshold value, to control the switching means so that they connect the accumulator to a certain charging current source.

According to the second embodiment of the invention the invention is characterized in that the measurement and control means have been arranged:
- to measure the value of the charging current change in relation to time
- to measure the value of the voltage difference change between the blocks in relation to time
- as a response to the observation according to which the value of the charging current change in relation to time has returned from its negative limit value to essentially zero and the value of the voltage difference change of the blocks relation to time has returned from its positive limit value to essentially zero, to control the switching means so that they disconnect the accumulator from a certain charging current source.

The invention relates also to a method characterized in that according to the first embodiment of the invention it consists of phases, in which
- the block specific initial value of the open cell voltage of the charged accumulator is measured
- a certain threshold value from the open cell voltage of a block is produced
- the measured value of the open cell voltage of a block is compared with the threshold value
- as a response to the observation according to which the measured value of the open cell voltage of the block has reached the threshold value, a charging current is connected to the accumulator.

According to the second embodiment of the invention the invention is characterized in that it consists of phases, in which
- the value of the charging current change in relation to time is measured
- the value of voltage difference change between the blocks in relation to time is measured
- as a response to the observation according to which the value of the charging current change in relation to time has returned from its positive limit value to essentially zero the accumulator is disconnected from the charging current.

A VRLA-accumulator, which is also called a string, as it is known comprises group cells i.e. monoblocks, which further consist of cells. There can be several VRLA accumulators so that they usually are connected parallel to each other, in that case it is called the accumulator unit. In the system according to the present invention the open cell voltage is monitored most beneficially in each block separately. In addition, the charging current and temperature of the accumulator are monitored. A minimum value has been defined for the open cell voltage of the monoblock, which corresponds to the open cell voltage in case the capacity of the monoblock has decreased, when the accumulator has discharged, to a certain minimum level. The minimum value takes into count the initial level of the open cell voltage when the earlier charging has ended, it also takes into count the temperature change compared with the moment the earlier charging has ended and the maximum amount the capacity of the monoblock is allowed to decrease before the following charging period must be started at the latest. The charging is started when the open cell voltage of a certain monoblock reaches its minimum value or at the latest when a certain maximum time after the earlier charging has elapsed.

The charging current and the voltage difference between different monoblocks of the accumulator is measured in order to determine the time to end charging. The time derivates of these quantities follow certain pattern characteristics, when the accumulator cells reach their full charge. It is advantageous to select a situation, in which the time derivates of the charging current and the voltage difference have essentially zero values as the end criterium or in which a certain maximum time has elapsed after the time derivate of the potential difference of the monoblocks reached its positive maximum value.

The criteria according to the present invention, the fulfillment of which control the starting and ending of charging, are at least partially tied to such reference values, which are measured from the accumulator itself instead of e.g. the starting of charging always only after a certain constant (regular) time after the earlier charging. A good adaptivity is achieved by this i.e. the method and system according to the invention adapt especially well to the individual characteristics of each accumulator to be charged.

BRIEF DESCRIPTION OF THE DRAWINGS

In the following the present invention is described in more detail by referring to beneficial embodiments presented as examples and referring to the enclosed figures, in which.

DETAILED DESCRIPTION

Figure 1:
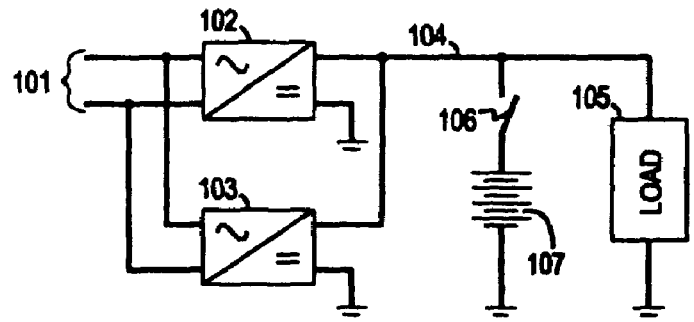
FIG. 1 shows a known simple standby electric supply.
Figure 2:
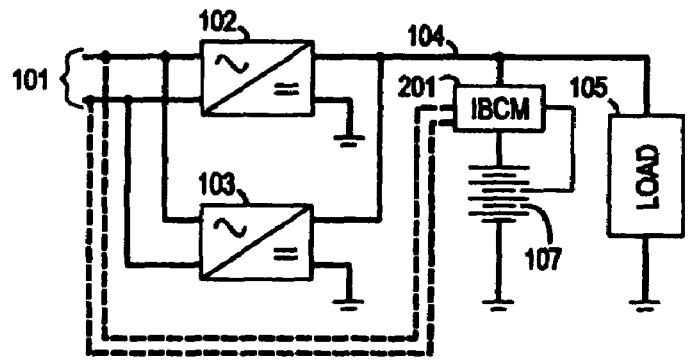
FIG. 2 shows a known more advanced standby electric supply.

In connection with the above description of the state of the art FIGS. 1 and 2 are referred to, so in the following description of the invention and of its beneficial embodiments reference is made mainly to FIGS. 3–11. The figures use the same reference numbers for the parts corresponding each other.

Figure 3:
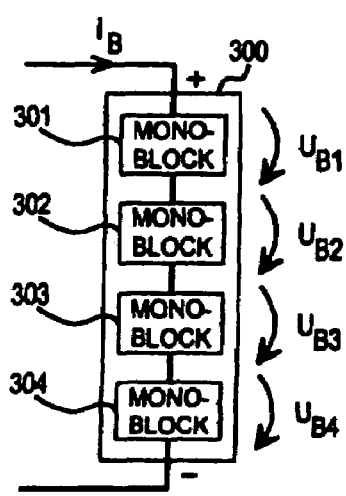
FIG. 3 shows general outlines of a VRLA accumulator.

FIG. 3 shows a VRLA accumulator i.e. a string 300, which consists of monoblocks 301, 302, 303 and 304 connected in series. Each monoblock comprises of the same number of cells, separate cells are not shown in FIG. 3. The number of monoblocks in string depends on of how many cells each monoblock is constructed. Usually the number of blocks is 4, 6, 8 and 24. The voltage over one monoblock can be marked with $u_{Bi}$, in which i=1, 2, 3 or 4. The current flowing through the string can be marked with $i_B$ and its sign is in the figure selected so that the charging current i.e. the current to the positive pole of the string is marked positive.

Figure 4:
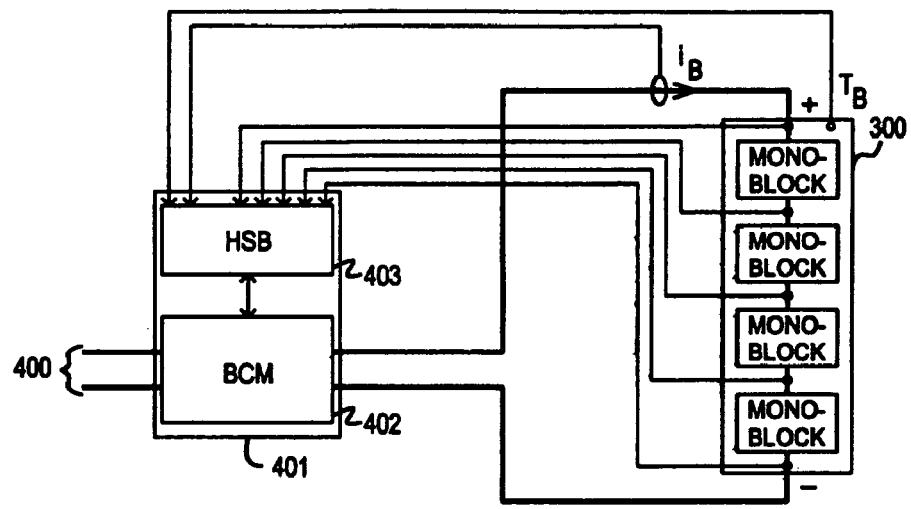
FIG. 4 shows one beneficial embodiment of the system according to the present invention.

FIG. 4 shows an arrangement, in which the VRLA accumulator 300 presented in FIG. 3 is connected to a switching and charging device i.e. the IBCM module 401. The two conductor line 400 to the left is an input and output line, through which the arrangement presented in FIG. 4 can be connected to the feed line between the rectifiers and the load (not shown in the figure). The IBCM module 401 consists of a switching and stabilizing block 402 and a control block 403. There is a two-way connection between them so that the control block 403 receives information about the state of the switching and stabilizing block 402 and is able to control its operation. The switching and stabilizing block 402 has been connected to the positive and negative poles of the VRLA accumulator 300. There is a number of measurement connections from the VRLA accumulator 300 to the control block 403 so that, the control block is able to measure the voltage $u_{Bi}$ of each block separately and, in addition, the charging current $i_B$ and the temperature $T_B$ of the VRLA accumulator.

The measurement arrangement shown in FIG. 4 for measuring the quantities $u_{Bi}$, $i_B$ and $T_B$ is naturally only an example. It is not essential for the present invention how the values of the quantities in question are measured and defined, as far as they can be used by the control block 403. FIG. 4 shows for clarity only one VRLA accumulator 300, although from the application point of view of the application of the present invention it does not matter how many accumulators have been connected to a certain IBCM module. Each accumulator connected to the IBCM module can be handled as an independent unit in the way shown in FIG. 4 concerning the accumulator 300.

The switching and stabilizing unit 402 has been dimensioned so that it can produce a certain charging voltage $U_C$ and a certain charging current $I_C$. The maximum possible values of these quantities must be selected so that they are as high as possible, but however smaller than the detrimental level to the accumulators. When the maximum value of the charging current is determined it must be taken into consideration that no excessive requirements are laid on the components of the equipment due to too high charging current value. The higher the maximum possible value of the charging current, the sooner the accumulators can be fully charged, but the more expensive components must be used for accomplishing the switching and stabilizing block 402. The optimal maximum value for the charging current can be selected by defining a utility function for charging time and by solving a two-dimensional optimizing problem, the dimensions of which are the manufacturing costs and the utility function mentioned above that expresses the charging time.

It has been assumed in FIG. 4 that the switching and stabilizing block complies with the so called constant current and constant voltage principle. This means that when the charging starts a certain maximum charging current value limits it. The charging voltage rises to its maximum value during constant current charging. When the maximum value of the charging voltage has been reached the charging current gets lower quickly, because the charging is now limited by the maximum value of the charging voltage.

Figure 5:
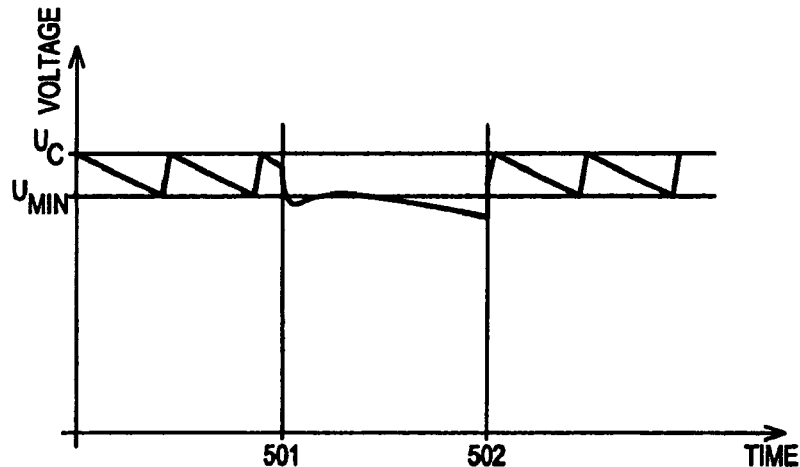
FIG. 5 shows the behavior of the accumulator voltage in different situations.

FIG. 5 shows in principle the operation of the embodiment according to FIG. 4.

The vertical axis shows the voltage of the accumulator and the horizontal axis shows the time in some arbitrary units. The maximum charging voltage $U_C$ and a certain minimum voltage $U_{MIN}$ have been marked on the voltage axis. In the standby state the operation of the embodiment follows a cycle, in which the linear fall of the voltage from $U_C$ to $U_{MIN}$ caused by the internal self discharge of the accumulator, and the following fast voltage rise back to $U_C$ caused by switching on the charging, are repeated. In the discharging state between the moments 501 and 502 the accumulator is connected through the switching and stabilizing block to the load, in which case the voltage of the accumulator falls during discharge of the accumulator. Returning to the standby state means that the cyclically alternating charging and self discharging cycles continue. Most essential for the present invention in FIG. 5 is how the criteria for starting and ending the charging are selected during the standby state so that the charging control functions optimally also after a normal discharge.

From the theory describing the chemical functioning of lead accumulators is known the so called Nernst's equation, according to which there exists a nearly linear relationship between the open cell voltage $u_{ocv}$ of the cell and the specific gravity SG, which can be represented at 25° C. (298° K) temperature using the equation $$u_{ocv}=0.84+SG. \tag{1}$$

If the change of the open cell voltage is represented by $\Delta u_{ocv}$ and the change of the specific gravity by $\Delta SG$, so it is possible, according to the equation (1), to write $$\Delta u_{ocv}=\Delta SG \tag{2}$$

On the other hand it is known that there is essentially a linear relation by a proportional coefficient k between the capacity C of the cell and the specific gravity SG, therefore it can be written $$\Delta C=k\Delta SG \tag{3}$$

and on the basis of equations (2) and (3)

$$\Delta u_{ocv}=\Delta C/k. \tag{4}$$

The cells in the same monoblock can be regarded as functioning in the same way, in which case the total open cell voltage change $\Delta u_{Bi,ocv}$ of a certain i:th block is derived simply by multiplying the result concerning one cell by the number n of cells i.e.

$$\Delta u_{Bi,ocv}=(n/k)\Delta C. \tag{5}$$

The change in the open cell voltage of the accumulator in relation to the percentage change of its capacity is constant relating to the particular accumulator, the value of which can be estimated theoretically. The manufacturers of the accumulator deliver usually the exact value, which is based on measurements. If this constant is marked with L, its definition can be written as $$L=\Delta u_{ocv}/[100\cdot(\Delta C/C)], \tag{6}$$

from which it can be derived a percentile change of the capacity corresponding to the change $\Delta u_{ocv}$ of the open cell voltage.

$$\Delta u_{ocv} L \cdot [100 \cdot (\Delta C/C)], \quad (7)$$

In addition, the temperature characteristics of the open cell voltage of the lead accumulator cell is known. The temperature characteristics follows the equation $$\Delta u_{ocv}/\Delta T = 0.23 \text{ mV/K} \quad (8)$$

and can be directly generalized to the temperature behavior of the open cell voltage of a whole monoblock by multiplying the constant value according to the equation (7) by the number n of the cells in the monoblock.

It is assumed that the open cell voltage of a certain i:th monoblock is known at a time t1. If a minimum value $u_{Bi,ocv,min}$ is to be defined to which the open cell voltage is allowed to fall so that the capacity of the monoblock is not reduced more than a certain percentile part $(\Delta C/C) \cdot 100$, a formula can be written for this minimum value on the basis of the equations (1)–(8) presented above $$u_{Bi,ocv,min} \approx u_{Bi,ocv}(t1) + n \cdot 0.23 \frac{\text{mV}}{\text{K}} \cdot (T_B - T_B(t1)) - n \cdot L \cdot \frac{\Delta C}{C} \cdot 100, \quad (9)$$

in which

| | |
|---|---|
| $u_{Bi,ocv}(t1) =$ | open cell voltage of the i:th monoblock at time t1, |
| $n =$ | number of cells in monoblocks, |
| $T_B =$ | temperature of the monoblock at the moment of observation |
| $T_B(t1) =$ | the temperature of the block at time t1 |
| $L =$ | constant, which describes the influence of the percentage change of the capacity on the cell voltage and |
| $(\Delta C/C) \cdot 100 =$ | is the maximum allowed percentile loss of capacity during the observation period. |

Figure 6:
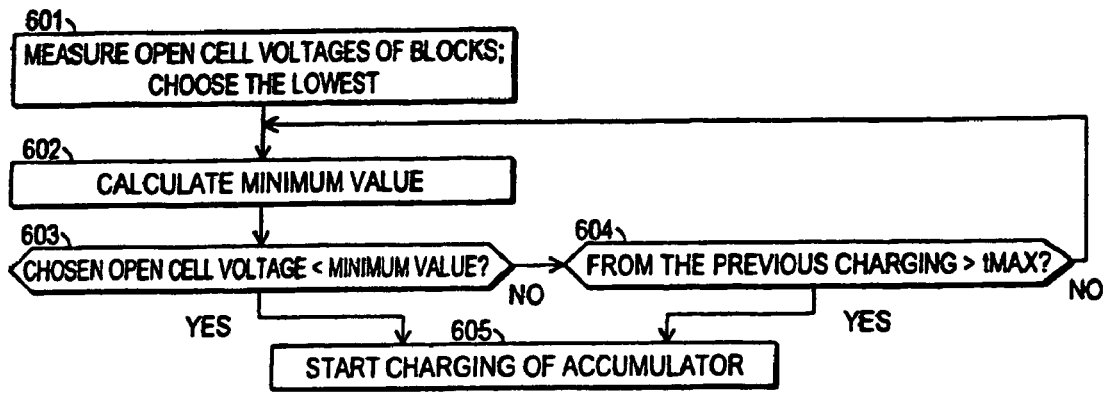
FIG. 6 shows a method for starting the charging according to a beneficial embodiment of the invention.

The formula (9) according to the beneficial embodiment of the present invention is used for defining the minimum voltage $U_{MIN}$ presented in FIG. 5. Because the accumulator consists of several monoblocks due to the manufacturing tolerances and individual properties of which their open cell voltages differ slightly, the method shown in FIG. 6 is used most beneficially. This method is described in more detail in the following.

The state 601 is the initial state, in which the open cell voltage of each monoblock is measured in a state in which the accumulator is essentially fully charged. Thus the above mentioned time t1 is in question, so the measurement results are marked with $U_{Bi,ocv}(t1)$, in which the index i gets as many values as the accumulator in question has blocks. The cell voltage of the lead accumulator stabilizes to its actual open cell voltage only after certain time (approximately 1–2 days) after the previous charging has ended, so it is most beneficial to select the moment t1 so that it has passed at least 24 hours after the previous charging has ended. The most suitable period, which separates the moment t1 from the ending of the charging can be sought by experimenting.

In addition, in state 601 the lowest measurement result is selected. It is assumed that the lowest open cell voltage was measured from the j:th block, in which case the lowest value selected in the 601 can be marked with $u_{Bj,ocv}(t1)$. After that only the j:th block in question is monitored.

In the state 602 the formula (9) is used to calculate a minimum value to which the open cell voltage is allowed to fall so that the capacity does not become smaller than a certain predefined percentile part. The specifically selected smallest value $u_{Bj,ocv}(t1)$ is substituted in formula (9) for calculating the minimum value so the calculated minimum value can be marked with $u_{Bj,ocv,min}$. The state 602 is a part of a cycle, which monitors how the open cell voltage of its j:th block decreases, the j:th block being the block the open cell voltage of which was found to be the lowest in state 601. The states 603 and 604 form the other parts of the cycle. The cycle is repeated till the open cell voltage of the j:th block reaches the minimum value calculated in state 602 or till a certain maximum time $t_{cmax}$ has elapsed from previous charging. If either of these criteria is fulfilled it leads to the state 605 in which the charging of the accumulator is started.

Figure 7:
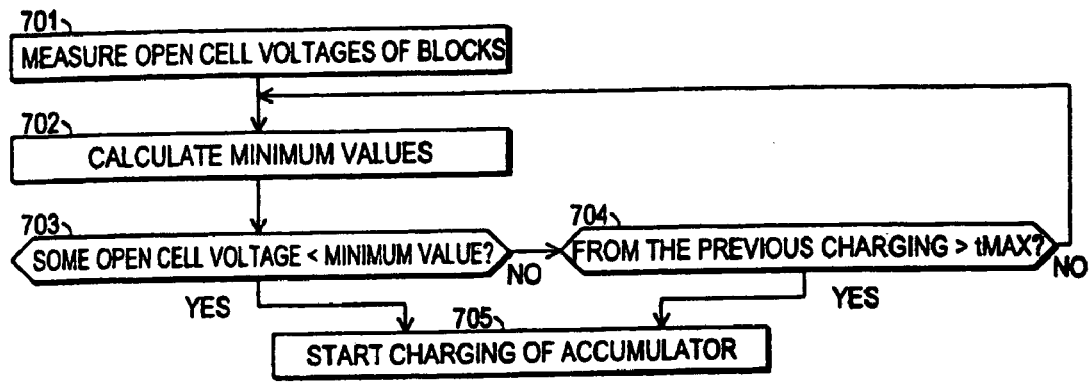
FIG. 7 shows a method for starting the charging according to another beneficial embodiment of the invention.

The simple embodiment presented above is based on monitoring the decreasing of the open cell voltage only in one block. Also other kinds of embodiments of the present invention can be presented. FIG. 7 shows an embodiment in the initial state 701 of which the open cell voltage of each block is measured at the moment when the accumulator is essentially fully charged taking into consideration the settling time of the open cell voltage described above. The measurement results are marked again with $u_{Bi,ocv}(t1)$, in which the index i gets as many values as the accumulator in question has blocks.

In the embodiment shown in FIG. 7 none of the measurement results is given precedence to, instead in state 702 an individual minimum value is calculated for each block using the formula (9), in which case the open cell voltage is allowed to decrease so that the capacity is not getting smaller than a certain defined percentile part. For calculating the individual minimum value for each block the measured open cell voltage value $u_{Bi,ocv}(t1)$ is substituted in the formula (9).

The state 702 is again a part of a cycle, in which this time is observed how the open cell voltage of each block decreases. The states 703 and 704 form the other parts of the cycle. The cycle is repeated till the open cell voltage of one block reaches the individual minimum value, which has been calculated for each block separately or till a certain maximum time $t_{cmax}$ has elapsed from the previous charging. If either of these criteria is fulfilled it leads to state 705 in which the charging of the accumulator will be started.

In addition to the embodiments described above, embodiments according to the present invention can be presented, in which for calculating minimum values and for monitoring the individual open cell voltages of the different blocks some interblock calculations are applied. For example, all the voltages to be observed can be taken as mean and median values of interblock voltages. In this case, however, a part of the benefits of the method according to the present invention is lost, because information of individual blocks is lost.

Figure 8:
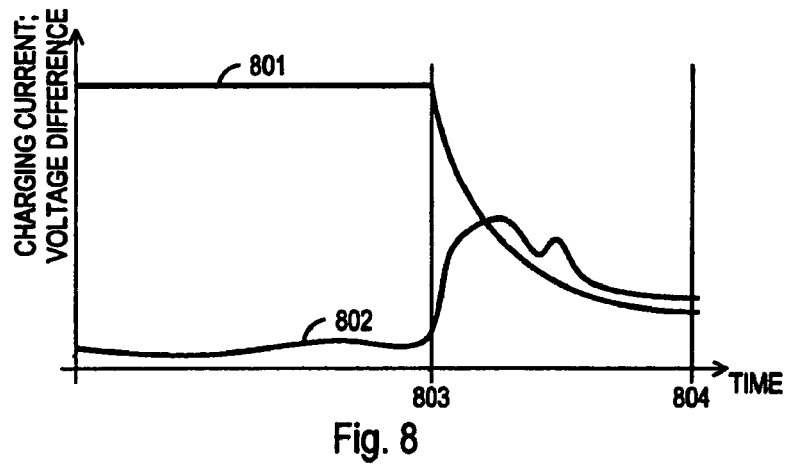
FIG. 8 shows the behavior of the charging current and the voltage difference between the blocks at the end of the charging.

In the following it is studied when charging the accumulator is beneficial to stop i.e. how the arrangement according to the present invention functions near the maximum voltage $U_C$ of the charging shown in FIG. 5. FIG. 8 shows an experimental measurement, in which the curve 801 shows the value of the charging current $i_B$ in relation to the maximum value of the charging current and the curve 802 shows the value of the maximum difference $\Delta u_{max}$ between the block voltages $u_{Bi}$, which can be mathematically defined using the formula $$\Delta u_{max} = \max_{i1,i2}[u_{Bi1} - u_{Bi2}] \quad (10)$$

In FIG. 8 the horizontal axis represents time and the vertical axis represents both the relative value of the charging current and the value of maximum difference of the block voltages; the units are irrelevant. At the moment 803 the above mentioned maximum value $U_C$ of the charging voltage is reached, the charging current starts to get smaller quickly: its time derivate ($di_B/dt$) is high and has a negative value. At the same time the value of the maximum difference $\Delta u_{max}$ of the block voltages $U_{Bi}$ rises strongly, because the voltage of the first full charged block rises and the voltage of other blocks gets smaller correspondingly: the time derivate ($d\Delta u_{max}/dt$) is also high and it has a positive value. When the other cells become fully charged, each in its turn, the absolute value of the time derivate ($di_B/dt$) of the charging current gets smaller. The time derivate ($d\Delta u_{max}/dt$) of the maximum difference of the block voltages changes first negative and can after that oscillate a few times to both directions around the zero, but starts at the end to approach steadily zero. At the moment 804 both derivates ($di_B/dt$) and ($d\Delta u_{max}/dt$) are essentially zero i.e. smaller by their absolute value than a certain small threshold value.

Figure 9:
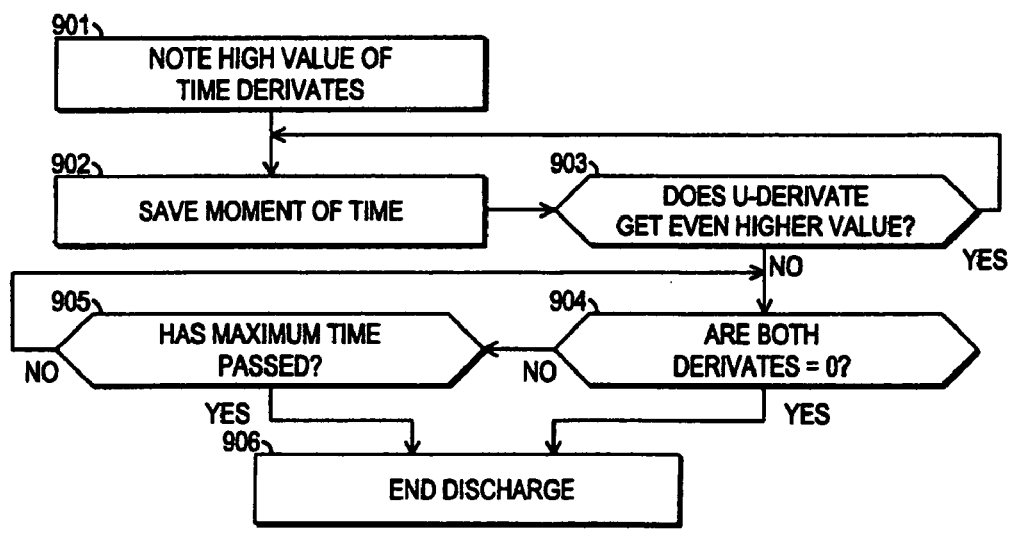
FIG. 9 shows a method according to a beneficial embodiment of the invention for stopping the charging.

According to a beneficial embodiment of the present invention the charging is ended as shown in the flow diagram of FIG. 9. In the state 901 it is noticed that the time derivate ($di_B/dt$) has a high and negative value and the time derivate ($d\Delta u_{max}/dt$) has a high and positive value. The threshold values for considering the values of the time derivates high can be found out experimentally. The states 902 and 903 form a cycle the purpose of which is to observe the time derivate ($d\Delta u_{max}/dt$) of maximum difference of the block voltages in cosecutive periods of time and to store the information when it reached its highest value. When this information has been stored i.e. higher values are no more observed, state 904 is entered, in which it is observed how the absolute values of both time derivates ($di_B/dt$) and ($d\Delta u_{max}/dt$) decrease toward zero. States 904 and 905 make a cycle, which is repeated till both time derivates ($di_B/dt$) and ($d\Delta u_{max}/dt$) are essentially zero or till a certain maximum time tmax has elapsed from the moment when the time derivate ($d\Delta u_{max}/dt$) of maximum difference of the block voltages reached its maximum value. Positive result detection in any of the states 904 and 905 leads to state 906 in which the charging of the accumulator is stopped.

It is possible to make changes and additions to the method presented in FIG. 9 without departing from the principle of the invention. For instance it is possible to add a restriction to stop the charging, according to which the charging is also stopped if a certain maximum time has elapsed after it has been started, even if neither of the criteria according to states 904 and 905 is met. In addition, to stop the charging can be made dependable of the measured temperature of the accumulator so that exceeding a certain predetermined threshold temperature causes the stop to the charging.

Figure 10:
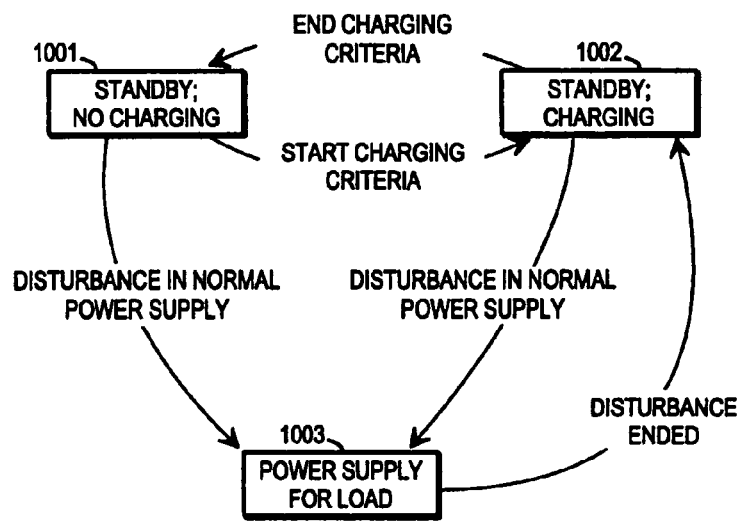
FIG. 10 shows the operation of a system according to a beneficial embodiment of the invention as a state diagram and FIG. 11 shows a system according to another beneficial embodiment of the invention.

FIG. 10 is a state diagram, which describes the operation of the standby electric supply according to the invention. There are three states defined in it, which are the standby state without charging 1001, the standby state with charging 1002 and the state 1003, in which the electrical energy is discharged from the accumulator to the load. According to a beneficial embodiment of the invention the transfer from state 1001 to state 1002 happens when one of the criteria is fulfilled, which have been described above in connection with FIGS. 6 and 7. Correspondingly the transfer from state 1002 to state 1001 happens when one of the criteria is fulfilled, which have been described above in connection with FIGS. 8 and 9. The transfer to state 1003 happens as such in a known way when the rectifier or rectifiers which can as such be according to the state of the art cannot for reason or other to supply the load with the electrical energy it requires. Correspondingly, when the power supply disturbance of the rectifiers ends, the standby electric supply returns in as such a known way to state 1002, from which the return to the state 1001 happens when the charging according to the criteria mentioned above is ended.

Figure 11:
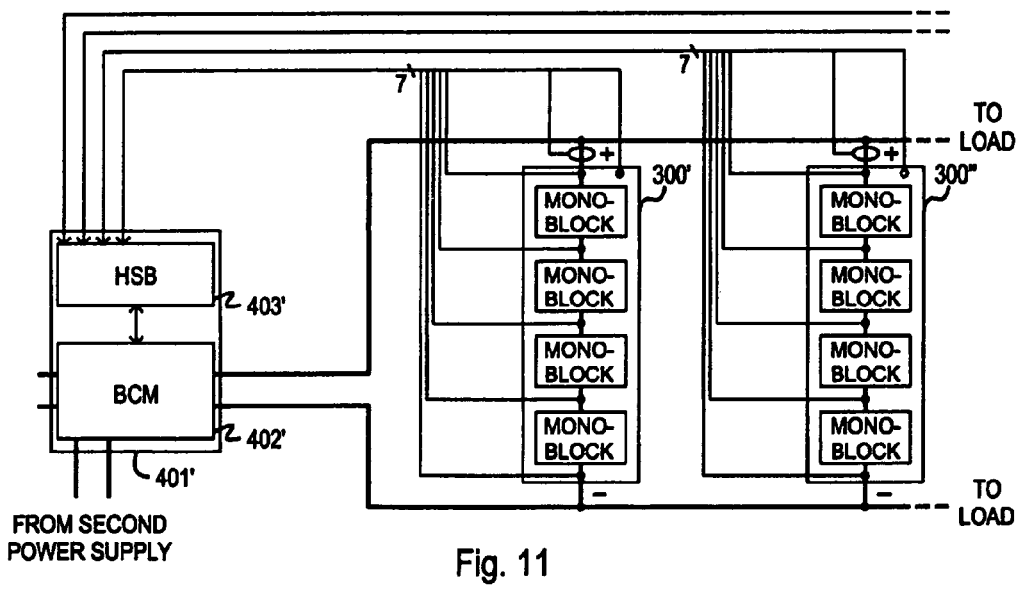

FIG. 11 shows one way for extending the invention for a system which has several VRLA accumulators connected parallel to each other. Two accumulators 300' and 300" are shown in the figure, but in the invention the number of accumulators connected to the system is not restricted in any way. In the system shown in FIG. 11 each accumulator is handled separately in the measurements i.e. the measurement of the charging current, the measurement of the temperature and the measurements of the block voltages are made separately for each accumulator. The accumulators are, however, connected parallel to each other for charging, so in the system either all accumulators are being charged or no accumulator is being charged. For the embodiments described above this means that if the criterium according to FIG. 6 for starting the charging is used, the block of the accumulator is searched, the open cell voltage of which is lowest at the moment t1 and charging all accumulators is started when the open cell voltage of the block in question reaches the minimum value defined for it. In an embodiment according to FIG. 7 the open cell voltages of all blocks in the whole accumulator system are monitored separately and each of them are compared with the minimum value individual for each block. Correspondingly if the embodiment according to FIG. 9 is applied for ending the charging the charging is stopped when in all the accumulators the time derivates of the charging current and of the voltage difference of the blocks are essentially zero or when a maximum time has elapsed from the moment when high values of the derivates were detected or when a temperature exceeding a certain threshold is measured in one of the accumulators.

In a system consisting of several accumulators, the accumulators can also be connected using individual switching means to the IBCM module, in which case each accumulator can be charged separately if required. In this case the structure of the IBCM module becomes very complicated. The embodiment in FIG. 11 can be simplified so that the charging current is not measured separately from each accumulator but the charging current of the whole accumulator system.

In the above only those systems have been handled, in which the measurement and follow-up of voltage and current values which describe the state of the accumulator system is done locally essentially in the same unit, which unit also, if required, connects the accumulator to the charging supply and disconnects it from the supply. The invention can also be applied so that the state of the accumulator system can be monitored and the switching commands can be given in addition to or instead of the local unit via a remote control system. In this case it is not necessary to have other equipment in connection with the accumulator system but the measurement elements, switches and telemetric equipment by which the measurement results are transmitted and the switching commands are received e.g. via Internet or telephone network.

The features of the invention described above can be applied in many different ways together or separately. It is e.g. possible to use the method described above according to the invention only for starting the charging of the accumulator and to stop the charging after a certain constant charging time or when the maximum charging voltage has been reached. On the other hand charging the accumulator can be started according to another criterium and use the above described method according to the invention only for stopping the charging of the accumulator. The most beneficial result can be attained, however, so that the invention is applied both to the starting of the charging and for stopping the charging.

What is claimed is:

1. A standby electric supply for ensuring the power for a load, comprising:
   an accumulator comprising multiple interconnected blocks;
   a switching portion that conditionally connects the accumulator to the load or to a charging current supply;
   a measurement and control portion that produces measurement results for describing the state of the accumulator and that controls the switching portion on the basis of the measurement results produced;
   wherein the measurement and control portion is arranged:
   to measure, at an initial time, the block specific initial value of the open cell voltage from the accumulator when charged;
   to produce from the measured block specific initial value of the open cell voltage a threshold value;
   to compare a measured block specific open cell voltage value at an observed time different from the initial time with the threshold value; and
   if the measured block specific open cell voltage value at the observed time has reached the threshold value, to control the switching portion to connect the accumulator to the charging current supply.

2. A standby electric supply according to claim 1 wherein the measurement and control portion is configured:
   to measure a charging current change equal to the value of the change of the charging current in relation to time;
   to measure a voltage difference change equal to the value of the change of the voltage difference between the blocks in relation to time; and
   responsive to the charging current change, returning from a negative limit value approximately to zero and the voltage difference change, returning from a positive limit value approximately to zero, to control the switching portion to disconnect the accumulator from the charging current supply.

3. A standby electric supply according to claim 1 wherein the switching portion is further arranged to conditionally connect the accumulator to the charging current supply.

4. A standby electric supply according to claim 1 wherein the charging current supply is a first charging current supply, and wherein the switching portion is further arranged to conditionally connect the accumulator to a second charging current supply.

5. A standby electric supply for ensuring the power for a certain load, comprising:
   an accumulator comprising multiple interconnected blocks;
   a switching portion that conditionally connects the accumulator to the load or to a charging current supply;
   a measurement and control portion that produces measurement results for describing the status of the accumulator and that controls the switching portion on the basis of the measurement results produced;
   wherein the measurement and control portion is arranged:
   to measure a charging current change equal to the value of the change of the charging current in relation to time;
   to measure a voltage difference change equal to the value of the change of the voltage difference between the blocks in relation to time; and
   responsive to the charging current change, returning from a negative limit value approximately to zero and the voltage difference change, returning from a positive limit value approximately to zero, to control the switching portion to disconnect the accumulator from the charging current supply.

6. A method for controlling a standby electric supply, which comprises an accumulator comprising multiple blocks, comprising:
   measuring a block specific initial value of the open cell voltage from the charged accumulator at an initial time;
   calculating a threshold value based on the measured block specific initial value of the open cell voltage;
   measuring a block specific value of the open cell voltage at an observed time different from the initial time;
   comparing the block specific value of the open cell voltage at the observed time with the threshold value; and
   connecting a charging current to the accumulator if the measured block specific value of the open cell voltage at the observed time has reached the threshold value.

7. A method according to claim 6 wherein calculating the threshold value comprises calculating a threshold value by a formula $$u_{Bi,ocv,\min} = u_{Bi,ocv}(t1) + n \cdot 0.23 \frac{\text{mV}}{\text{K}} \cdot (T_B - T_B(t1)) - n \cdot L \cdot \frac{\Delta C}{C} \cdot 100,$$

in which $U_{Bi,ocv}(t1)$=open cell voltage of the i: th monoblock at time t1,

| | |
|---|---|
| n = | number of cells in monoblocks, |
| $T_B$ = | temperature of the monoblock at the observed time, |
| $T_B(t1)$ = | the temperature of the block at time t1, |
| L = | a constant, which describes the influence of the percentage change of the capacity on the cell voltage, and |
| $\frac{\Delta C}{C} \cdot 100$ = | the maximum allowed percentile loss of capacity during the observation period. |

8. A method according to claim 6 wherein measuring a block specific initial value of the open cell voltage occurs at least after 24 hours after a previous charging of the accumulator has ended.

9. A method according to claim 6 further comprising connecting a charging current to the accumulator if a predetermined maximum time has elapsed since a previous charging of the accumulator.

10. A method according to claim 6 further comprising:
    measuring a charging current change equal to the value of the charging current change in relation to time;
    measuring a voltage difference change equal to the value of the change of the voltage difference between the blocks in relation to time; and
    responsive to the charging current change, returning from a negative limit value approximately to zero and the voltage difference change, returning from a positive limit value approximately to zero, the accumulator is disconnected from the charging current.

11. A method for controlling the operation of a standby electric supply comprising an accumulator comprising multiple blocks, comprising:
    measuring a charging current change equal to the value of the charging current change in relation to time;

measuring a voltage difference change equal to the value of the change of the voltage difference between the blocks in relation to time; and responsive to the charging current change, returning from a negative limit value approximately to zero and the voltage difference change, from a positive limit value approximately to zero, the accumulator is disconnected from the charging current.

12. A method according to claim 11 further comprising: responsive to the voltage difference change between the blocks in relation to time returning to the positive limit value, and responsive to the time elapsed reaching a certain maximum value, disconnecting the accumulator from the charging current.

13. A method according to claim 6, characterized in that
wherein measuring a block specific initial value of the open cell voltage comprises measuring the block specific initial value of the open cell voltage individually for each of the blocks of the accumulator and selecting a smallest measured block specific initial value of the open cell voltage corresponding to a lowest voltage block;
wherein calculating a threshold value includes calculating a threshold value equal to the selected smallest measured block specific initial value less a maximum allowed loss of capacity of the block resulting from discharge and corrected for open cell voltage change based on a difference in temperature at the initial time and at the observed time; and
wherein the block specific open cell voltage value of the open cell voltage at the observed time that is compared to the threshold value is measured from the lowest voltage block.

14. A method according to claim 6, characterized in that
wherein measuring a block specific initial value of the open cell voltage comprises measuring the block specific initial value of the open cell voltage individually for each of the blocks of the accumulator separately from the charged accumulator;
wherein calculating a threshold value includes calculating a threshold value based on the measured block specific initial values less a maximum allowed loss of capacity of the block resulting from discharge and corrected for open cell voltage change based on a difference in temperature at the initial time and at the observed time; and
wherein the block specific open cell voltage value of the open cell voltage at the observed time for each block is compared to the threshold value corresponding to the same block.

* * * * *